United States Patent
Gfeller et al.

(10) Patent No.: US 7,235,145 B2
(45) Date of Patent: Jun. 26, 2007

(54) METHOD FOR CONNECTING TWO BODIES

(75) Inventors: Balz Gfeller, Biel (CH); Christophe Gerber, Cornol (CH)

(73) Assignee: Berner Fachhochschule, Architektur, Holz and Bau (CH)

( * ) Notice: Subject to any disclaimer, the term of this patent is extended or adjusted under 35 U.S.C. 154(b) by 0 days.

(21) Appl. No.: 10/497,873

(22) PCT Filed: Dec. 18, 2002

(86) PCT No.: PCT/CH02/00711

§ 371 (c)(1),
(2), (4) Date: Jun. 7, 2004

(87) PCT Pub. No.: WO03/052017

PCT Pub. Date: Jun. 26, 2003

(65) Prior Publication Data

US 2005/0084682 A1 Apr. 21, 2005

(30) Foreign Application Priority Data

Dec. 18, 2001 (CH) .................................. 2312/01

(51) Int. Cl.
B32B 37/00 (2006.01)
(52) U.S. Cl. ..................... 156/73.5; 156/73.6
(58) Field of Classification Search ............... 156/73.5, 156/73.6, 308.2, 309.6, 580, 580.2, 73.1, 156/308.9, 580.1, 308.4; 264/68, 69
See application file for complete search history.

(56) References Cited

U.S. PATENT DOCUMENTS 3,627,602 A * 12/1971 Van Dijk ................... 156/73.1
4,232,086 A    11/1980 Mori et al.
6,033,505 A *  3/2000 Sugiyama et al. ......... 156/73.5
6,159,317 A * 12/2000 Sugiyama et al. ......... 156/73.5
6,241,836 B1*  6/2001 Skirha et al. .............. 156/73.5
6,312,548 B1  11/2001 Fathi et al.
6,364,977 B1*  4/2002 Simon ........................ 156/64
6,588,970 B1*  7/2003 Natrop ....................... 403/270

FOREIGN PATENT DOCUMENTS

| DE | 3045706 A1 | 12/1980 |
| DE | 3727187 A1 | 8/1987 |
| GB | 1311177 | 9/1970 |
| JP | 08057958 | 3/1996 |
| SU | 1794205 A3 | 12/1990 |
| WO | WO96/01377 | 1/1996 |

OTHER PUBLICATIONS

European Search Report—CH 23122001.
International Search Report—PCT/CH2002/000711.

* cited by examiner

*Primary Examiner*—James Sells
(74) *Attorney, Agent, or Firm*—Welsh & Katz, Ltd.

(57) ABSTRACT

The invention relates to a method for connecting two bodies according to which a connection means is arranged between connection surfaces of the bodies to be connected. The connection surfaces and the interlying connection means are held adjacent to each other. At least one of the bodies is mechanically stimulated in order to produce friction and frictional heat. The connection means contains at least one cross-linkable polymer or polymerisable and cross-linkable resin which is converted into a thermoplastic material by means of the frictional heat produced, rendering the connection means and the composite of the two bodies considerably more heat-resistant.

15 Claims, 2 Drawing Sheets

METHOD FOR CONNECTING TWO BODIES

FIELD OF INVENTION

The present invention relates to a method for connecting two bodies.

BACKGROUND

Bodies made of wood or wood-like materials can, for example, be connected through mechanical connection means, such as, for example, screws or nails, or through gluing, in which, in the last case, an adhesive is usually applied on both of the connection surfaces to be connected and both of the connection surfaces are then pressed together during a drying or hardening time which is dependent on the type of the adhesive. In a similar manner, bodies made of wood or wood-like materials can also be connected with synthetic material bodies.

These connection methods are disadvantageous for certain uses, since they could, for example, damage applied varnish or colour layers or they could discolour them and/or need a relatively long drying or hardening time.

In WO 96/01377 an alternative method for connecting such bodies is disclosed, in which between the connection surfaces of the bodies to be connected a thermoplastic layer is arranged as connection means. The connection surfaces and the interlying connection means are then held together and at least one of the bodies is mechanically stimulated, in order to produce friction and thus frictional heat, which causes the melting of the thermoplastic layer. Afterwards the mechanical stimulation is stopped and the melted thermoplastic, which is sticking on both connection surfaces, is cooled through drawing off heat in the surrounding body parts, whereby it changes its aggregation condition and becomes hard again.

Disadvantageous with this connection is that the connection means is thermoplastic and therefore has only a limited heat resistance. Many thermoplastics have also a poor resistance against climatic factors, such as, for example, moisture and/or UV radiation. In addition, the dissociation energy of the connection is relatively low, since during the connection no chemical reaction takes place. Finally, the quantity of heat needed for the melting process has to be removed out of the region of the weld spot through drawing off heat, so that hardening of the melted thermoplastic is possible. During this process the connection surfaces have to be held together, i.e. a rest period is necessary after stopping the mechanical stimulation, which is dependent on the properties of the thermoplastic, which can not be easily influenced by the user.

GB 1 311 177 A discloses a method for connecting a container with a cover by means of ultrasonic welding, wherein the connection means can be a cross-linkable resin. The ultrasonic welding is made however with a very high frequency of 20 kHz to 100 kHz, which has consequences for the movement of the connection surfaces to be connected.

In view of the disadvantages of the previously known, above described connection methods, the object of the invention is to provide a method for connecting two bodies of the type mentioned in the introductory part, with which a composite is producible which is more heat-resistant than a comparable composite produced with the method proposed in WO 96/01377. Preferably, in addition the connection method should be able to be better optimised by the user and the connection be able to be produced faster.

SUMMARY

The essence of the invention lies in the following: For a method for connecting two bodies a connection means is arranged between connection surfaces to be connected of the bodies. The connection surfaces and the interlying connection means are then held together and at least one of the bodies is mechanically stimulated, so that friction and frictional heat is produced. According to the invention the connection means contains at least one cross-linkable polymer or polymerisable and cross-linkable resin, which through the frictional heat is converted into a duroplastic. The mechanical stimulation of the at least one of the bodies takes place with a frequency of 50 Hz to 400 Hz and an amplitude of 0.5 mm to 2 mm.

Since a conversion takes place into a duroplastic which will not melt again with a subsequent heating up, the connection means and the composite of the two bodies become essentially more heat resistant. In addition, the resistance is also better against other climatic factors, such as, for example, moisture.

Meltable or liquid polymers or resins are in particular suitable for the method according to the invention, so that through the frictional heat the cross-linkable polymer or the polymerisable and cross-linkable resin is generally first melted, in case it is not already in liquid state. The polymer or resin thus covers the two connection surfaces and penetrates into potentially present pores, which, for example, are present in wood. By the conversion into a duroplastic, a cross-linking and eventually also a polymerisation then takes place, thus a chemical reaction, which can proceed exothermically. The frictional heat which is produced by rubbing promotes this chemical reaction and does not impede, as in the case of a thermoplastic, the hardening. In contrast to the case of a thermoplastic connection means, the heat present does not need to be drawn off for the hardening of the connection means, so that with suitable choice of the method parameters, the rest period, during which the two bodies after the end of the production of friction must be held together, i.e. the end of the production of friction being the end of the mechanical stimulation of the at least one body, can be reduced to practically null. The time for connecting two bodies can in this way, in comparison to the state of the art, be significantly shortened.

A further advantage of the method according to the invention for connecting two bodies is that a connection with a generally higher dissociation energy is achieved, in comparison to the methods with thermoplastic connection means for example by a factor of 10.

Finally, for the connection means, cross-linkable polymers or polymerisable and cross-linkable resins can be used, which in comparison to thermoplastics are in some cases more than 50% cheaper.

As resin preferably a polymerisable and cross-linkable resin is used, whose conversion into a duroplastic results from polycondensation or polyaddition. With advantage the polymer or resin is pre-polymerised, in particular pre-condensed, so that it is in the so called B-stage or resitol stage. The interrupted polymerisation and/or cross-linking is resumed by supply of frictional heat, wherein the pre-polymerised polymer or resin firstly melts, in case it is not already liquid, and afterwards the reaction irreversibly goes to completion and achieves the so called C-stage or resite stage. The presence of a liquid interstage of the polymer or resin before the solid final stage facilitates the covering of the two connection surfaces and thus a tight connection of connection means and connection surfaces.

The following resins have been shown to be especially suitable for the connection means: urea formaldehyde resin, melamine formaldehyde resin, melamine urea formaldehyde resin, melamine urea phenol formaldehyde resin, phenol formaldehyde resin, resorcin formaldehyde resin, cross-linkable isocyanate diol resin or a mixture of two or more of these resins. The conversion of these resins into a duroplastic results from polycondensation or polyaddition.

Likewise suitable as resin are epoxy resins, resins polymerisable to a cross-linkable polyurethane or as polymer a cross-linkable polyurethane.

In a preferred embodiment the connection means contains a hardener or a reaction retarder, which is compatible with the reaction system, which guarantees the conversion into a duroplastic. The hardener is, for example, an ammonium chloride or ammonium sulphate, while the reaction retarder is, for example, ammonia or an ammonium salt solution. The connection method can be optimised for a definite purpose of use with the aid of such additives, in particular with regard to the cure time or gel time.

In a preferred embodiment the connection means contains a filler and extender means, preferably stone dust, wood dust or wheat dust. This makes it possible to lower the costs for the connection means, and can make the application of the connection means easier.

In preferred embodiments of the method according to the invention the connection means is applied on one of the connection surfaces in liquid form, paste form or powder form. In particular with a powder form connection means, the two connection surfaces which are to be connected are not allowed to be too quickly moved towards each other, so that the connection means is not blown away. In order to nevertheless facilitate a high closing speed, the adhesion of the powder particles among each other can be increased by means of heating or addition of sticking material. In this way the blowing away can be reduced or totally avoided.

Alternatively the at least one polymer or resin in the connection means can be impregnated in a flat or rope shaped object, in particular paper or fleece. The paper weight lies generally between 10 and 180 g/m$^2$, while the content of polymer or resin, based on the paper weight, is preferably in the range of 20-350%. The fleece weight lies generally between 10 and 120 g/m$^2$, while the content of polymer or resin, based on the fleece weight, is preferably in the range of 40-200%. Such flat or rope shaped objects have the advantage that they are easy to handle.

In another preferred embodiment the connection means is integrally formed on the connection surface of one of the bodies as a component of the body. A connection means which is independent of the bodies to be connected can then be dispensed with, whereby the handling is made easier.

The connection means can be arranged in a plane, rope shaped or dot shaped between the connection surfaces to be connected, according to the purpose of use.

With advantage the mechanical stimulation of the at least one body is then stopped at the latest when the conversion of the at least one polymer or resin into a duroplastic is completed. In this way a mechanical destruction of the weld or joint is avoided.

Preferably the connection surfaces to be connected are moved relative to each other plane-parallel, through the mechanical stimulation of the at least one of the bodies. This produces a relatively large amount of friction, which consequently produces a corresponding amount of frictional heat.

In preferred embodiments the connection surfaces to be connected are moved relative to each other rotationally or linearly or orbitally, through the mechanical stimulation of the at least one of the bodies. These movements can be performed with an installation similar to those of the state of the art.

Preferably the connection surfaces and the interlying connection means are pressed against each other during the mechanical stimulation. In this way a tight contact between the connection means and the connection surfaces is guaranteed, wherein with porous bodies, such as for example wood, connection means is pressed into the pores, which achieves a better adhesion.

The method according to the invention for connecting two bodies occurs generally in several phases. For example in a first phase, the closing phase, one body is lead to the other on which the connection means is arranged. The pressure between the two bodies is at first 0 and increases then fairly quickly to, for example, 0.2 until 2.5 MPa, as soon as the second body also comes into contact with the connection means. The closing time is between about 0.1 and 10 s.

In a second phase, the weld phase, at least one body is mechanically stimulated, and in fact preferably with a frequency between about 50 and 400 Hz and an amplitude between about 0.5 and 2 mm. In this way friction arises between the two bodies and the connection means, which produces heat and the temperature of the connection means increases to a maximum of generally between about 150° C. and 350° C., whereby the connection means, in so far as it is used in solid form, melts. The weld time is in general between about 0.5 to 20 s.

In a third phase, the rest period phase, the pressure between the two bodies is further maintained, but the bodies are no longer mechanically stimulated. In this way frictional heat is not further produced and the connection means is slowly cooled off. At the same time the polymerisation and cross-linking of the connection means is finished, so that it is converted into a duroplastic. The rest period phase normally lasts between 0 and 15 s, depending on the connection means, in which the aim is for a rest period of as short a time as possible.

Subsequent to the rest period, in so far as such a rest period takes place, the pressure between the two bodies is reduced.

With the aid of the method according to the invention bodies with diverse compositions, for example wood, concrete, metal, glass, stone or synthetic material, can be connected stably with each other in a short period of time. If at least one body is made from wood, preferably a connection means that chemically combines with wood is used. For example, a connection means can be used that contains isocyanate, which reacts chemically with hydroxyl groups of the cellulose of wood. Due to the chemical reaction, the connection between the connection means and bodies is a lot stronger than for conventional methods.

A further aspect of the invention is a composite of two bodies, in which the bodies are connected through a duroplastic, wherein the composite is produced according to the above described method.

BRIEF DESCRIPTION OF THE DRAWINGS

In the following the method according to the invention for connecting two bodies is described in more detail by way of exemplary embodiments and with reference to the attached drawings, in which.

DETAILED DESCRIPTION

In the first embodiment, shown in FIGS. 1 to 6, two bodies 1 and 3 are connected with each other by means of a connection means 2. The two bodies 1, 3 consist of, for example, wood, concrete, metal, glass or synthetic material, and each have a connection surface 11 or 31 respectively, which are connected with each other through the connection means 2.

Figure 1:
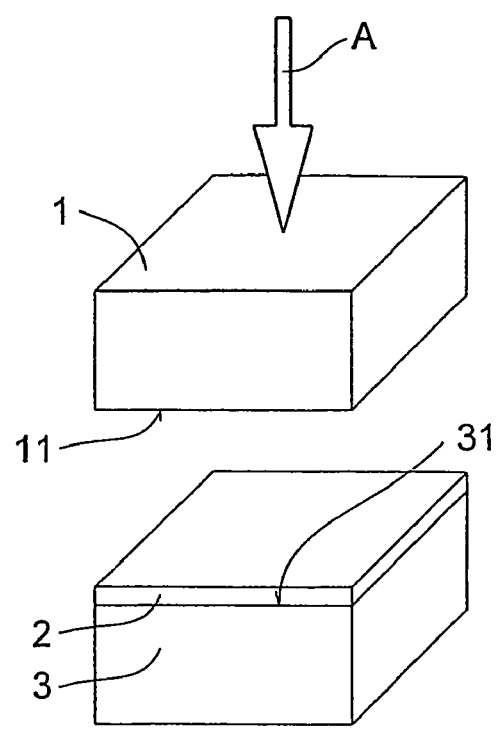
FIG. 1 shows the joining together of two bodies for connecting these with a connection means, which is arranged in a plane, according to a first embodiment.

According to FIG. 1, the connection means 2 is arranged in a plane on the connection surface 31 of the body 3 and covers this surface completely. It is applied here in the form of a paste on the connection surface 31, so that it adheres to this and is not blown away through the air pressure with the approaching of the body 1 in the direction of the arrow A. Alternatively one could apply the connection means 2 in a liquid or powder form, however then the approaching of the body 1 in the direction of the arrow A must be carried out sufficiently slowly, in order not to blow away the liquid or the powder. In order to nevertheless facilitate a high closing speed, the adhesion of the powder particles among each other can be increased by means of heating or addition of sticking material. In this way the blowing away can be reduced or totally avoided. Finally, the application of the connection means in the form of a flat object, in particular of paper or fleece, in which at least one polymer or resin is impregnated, or the integral design of the connection means 2 with the body 3, for example by co-extruding it with the body, is also possible.

The connection means 2 consists, for example, of a cross-linkable polymer or a polymerisable and cross-linkable resin, that through heat is convertible into a duroplastic. The polymer or resin is with advantage pre-polymerised and the interrupted polymerisation and/or cross-linking is resumed through supply of heat, wherein the pre-polymerised polymer or resin firstly melts, in the case where it is not already liquid, and then afterwards the reaction goes irreversibly to completion. The following resins and polymers have been shown to be especially suitable: urea formaldehyde resin, melamine formaldehyde resin, melamine urea formaldehyde resin, melamine urea phenol formaldehyde resin, phenol formaldehyde resin, resorcin formaldehyde resin, cross-linkable isocyanate diol resin, epoxy resin, resins polymerisable to a cross-linkable polyurethane, as well as cross-linkable polyurethane.

The connection means 2 can also contain several different such cross-linkable polymers or polymerisable and cross-linkable resins as well as additives, such as for example hardeners, preferably an ammonium chloride or ammonium sulphate, or a reaction retarder, preferably ammonia or an ammonium salt solution, and/or filler and extender means, preferably stone dust, wood dust or wheat dust.

Figure 2:
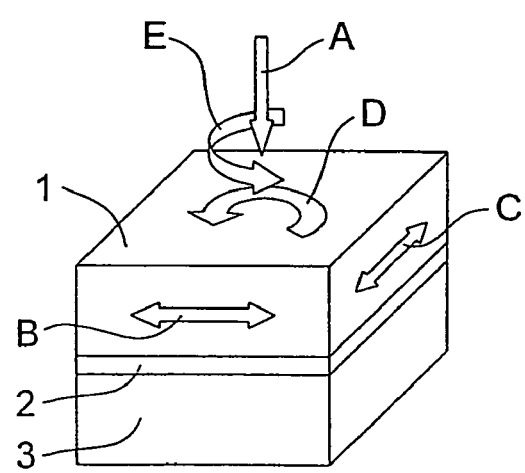
FIG. 2 shows the connection of the two bodies of FIG. 1 through friction welding.
Figure 3:
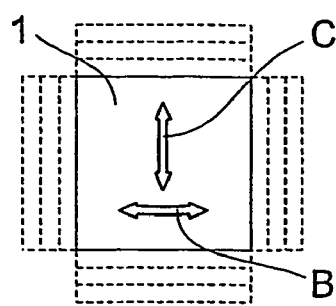
FIG. 3 shows a friction welding through linear, plane-parallel movement of one body.
Figure 4:
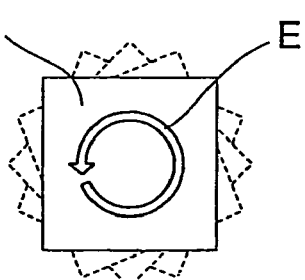
FIG. 4 shows a friction welding through rotative, plane-parallel movement of one body.
Figure 5:
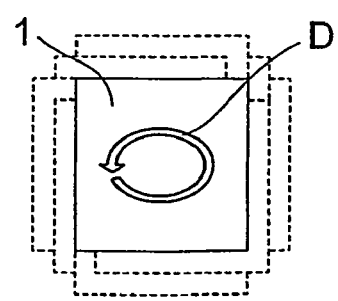
FIG. 5 shows a friction welding through orbital, plane-parallel movement of one body.

After the body 1 is brought onto the body 3 and the connection means 2, it is pressed against the body 3 and the connection means 2 according to arrow A in FIG. 2, which builds up a pressure. Following this, mechanical stimulation of body 1 is begun, so that its connection surface 11 is moved plane-parallel relative to the connection surface 31 of the body 3 and the connection means 2, whereby between the connection surface 11, the connection means 2 and the connection surface 31, friction, and therefore also frictional heat, is produced. Through the frictional heat the whole connection means 2, or at least the aforementioned at least one polymer or resin, is converted into a duroplastic, wherein it is preferably firstly made to melt, so that it optimally covers the connection surfaces 11 and 31. For porous bodies 1, 3, for example made out of wood, the melted connection means 2, the polymer or resin respectively, is pressed in addition by the pressure exercised by body 1 into the pores, which significantly strengthens the connection of the connection means 2 and the bodies 1 and 3.

The plane-parallel movement of the connection surface 11 can result out of different ways. The body 1 with the connection surface 11 can be, for example, moved linearly according to the arrows B and C in FIGS. 2 and 3; rotated according to arrow E in the FIGS. 2 and 4; or moved orbitally according to arrow D in the FIGS. 2 and 5. The mechanical stimulation of the body 1 and the exercise of a pressure in the direction of the arrow A can be performed by means of any device in the state of the art.

Figure 6:
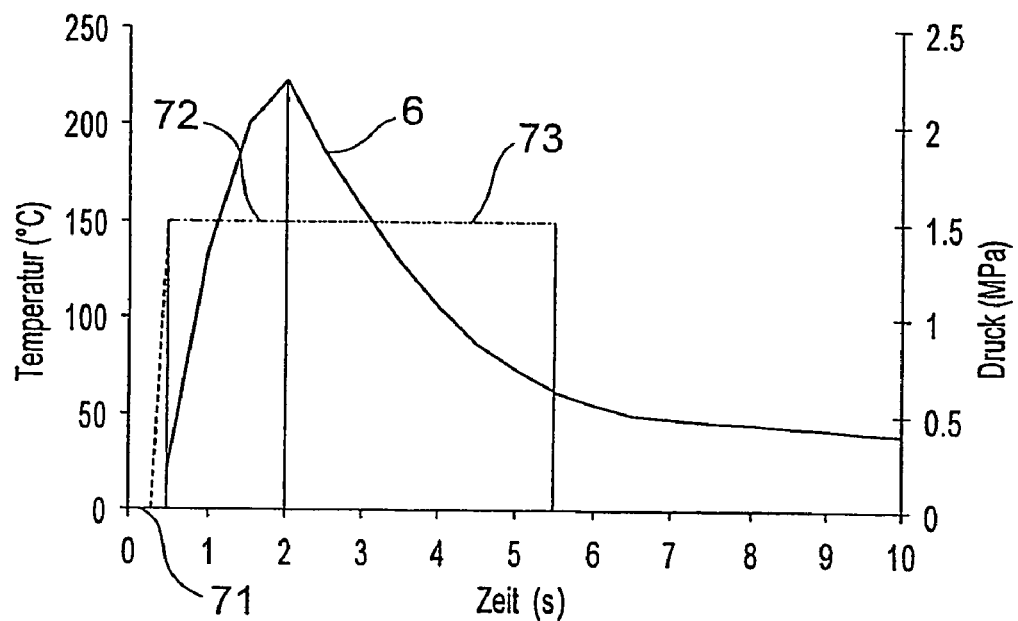
FIG. 6 shows a diagram of the sequence of events of the connection method according to the first embodiment with reference to the temperature of the connection means and to the pressure exercised on it.

In FIG. 6 the execution of the connection method according to the first embodiment is shown with reference to the temperature of the connection means 2 and to the pressure exercised on it. The curve 6 shows the temperature course of the connection means 2 during the connection process, the left scale applying to this. The lines 71, 72 and 73 relate to the pressure exercised via the body 1 on the connection means 2, according to the right scale. The bodies 1 and 3 are here made out of wood, while the connection means 2 consists of urea formaldehyde resin.

In a first phase, the closing phase, the body 1 is brought onto the body 3, on which the connection means 2 is arranged. The connection means 2 has the temperature of the surroundings. The pressure 71 is first 0 and increases then fairly quickly in the present case to 1.5 MPa, as soon as the body 1 comes into contact with the connection means 2. The closing time is about 0.5 s.

In a second phase, the weld phase, the body 1 is mechanically stimulated, wherein friction between the body 1, the connection means 2 and the body 3 arises, which produces heat. In this way the temperature 6 of the connection means 2 increases with constant pressure 72 to a maximum of here about 225° C. at 2 s and the connection means 2 melts. The weld time is about 1.5 s.

In a third phase, the rest period phase, the pressure 73 is further maintained, but the body 1 is no longer mechanically stimulated. In this way frictional heat is not further produced and the connection means 2 slowly cools off. At the same time the polymerisation and cross-linking of the connection means 2 is completed, so that it is converted into a duroplastic.

Figure 7:
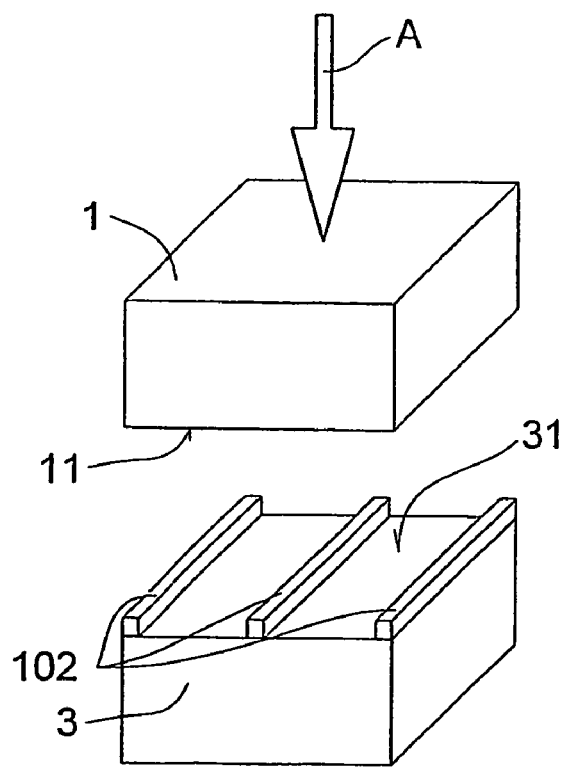
FIG. 7 shows the joining together of two bodies for connecting these with a rope shaped arranged connection means according to a second embodiment.

In the second embodiment, which is shown in FIG. 7, the connection means 102 is arranged rope shaped on the connection surface 31 of the body 3. Otherwise what has been said for the first embodiment is valid.

Figure 8:
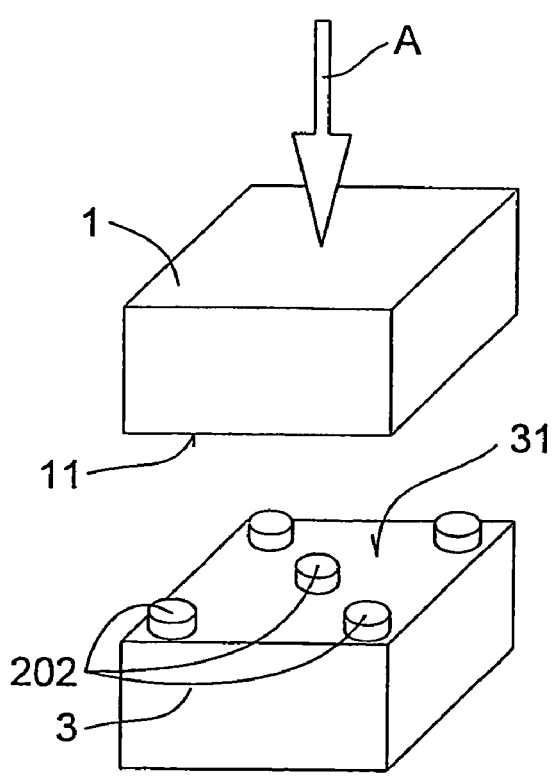
FIG. 8 shows the joining together of two bodies for connecting these with a dot shaped arranged connection means according to a third embodiment.

In the third embodiment, which is shown in FIG. 8, the connection means 202 is arranged dot shaped on the connection surface 31 of the body 3. Otherwise what has been said for the first embodiment is valid.

For the above described methods according to the invention further variants are realisable. Here expressly to be mentioned is also the fact that the connection means 2, 102 or 202 can be arranged firstly also on the connection surface 11 of the body 1, instead of on the connection surface 31 of the body 3.

Specific embodiments of method for connecting two bodies according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method for connecting two bodies, at least one of which is formed of wood, in which a connection means is arranged between connection surfaces of the bodies to be connected, the connection surfaces and the interlying connection means are held together and at least one of the bodies is mechanically stimulated, so that friction and frictional heat is produced, wherein the connection means contains at least one cross-linkable polymer or polymerisable and cross-linkable resin, which through the frictional heat is converted into a duroplastic, and wherein the mechanical stimulation of the at least one of the bodies takes place with a frequency of 50 Hz to 400 Hz and an amplitude of 0.5 mm to 2 mm.

2. The method according to claim 1, wherein a polymerisable and cross-linkable resin is used, whose conversion into a duroplastic results from polycondensation or polyaddition.

3. The method according to claim 1, wherein the polymer or resin is pre-polymerised, in particular pre-condensed.

4. The method according to claim 1, wherein the resin or at least one of the resins is selected from the group consisting of a urea formaldehyde resin, melamine formaldehyde resin, melamine urea formaldehyde resin, melamine urea phenol formaldehyde resin, phenol formaldehyde resin, resorcin formaldehyde resin, cross-linkable isocyanate diol resin or a mixture of two or more of these resins.

5. The method according to claim 1, wherein the resin or at least one of the resins is an epoxy resin or a resin polymerisable to a cross-linkable polyurethane or the polymer or at least one of the polymers is a cross-linkable polyurethane.

6. The method according to claim 1, wherein the connection means contains a hardener, preferably an ammonium chloride or ammonium sulphate, or a reaction retarder, preferably ammonia or an ammonium salt solution, and/or a filler and extender means, preferably stone dust, wood dust or wheat dust.

7. The method according to claim 1, wherein the connection means is applied in a liquid form, paste form or powder form on one of the connection surfaces.

8. The method according to claim 1, wherein the at least one polymer or resin in the connection means is impregnated in a flat or rope shaped object, in particular paper or fleece.

9. The method according to claim 1, wherein the connection means is integrally formed on the connection surface of one of the bodies as a component of the body.

10. The method according to claim 1, wherein the mechanical stimulation of the at least one body is then stopped at the latest when the conversion of the at least one polymer or resin into a duroplastic is completed.

11. The method according to claim 1, wherein through the mechanical stimulation of the at least one of the bodies the connection surfaces to be connected are moved relative to each other plane-parallel linearly.

12. The method according to claim 1, wherein the connection surfaces and the interlying connection means are pressed against each other during the mechanical stimulation.

13. The method according to claim 1, wherein a connection means that chemically combines with wood is used.

14. The method according to claim 1, wherein through the mechanical stimulation of the at least one of the bodies the connection surfaces to be connected are moved relative to each other plane-parallel rotationally.

15. The method according to claim 1, wherein through the mechanical stimulation of the at least one of the bodies the connection surfaces to be connected are moved relative to each other plane-parallel orbitally.

* * * * *